United States Patent [19]

Owen

[11] Patent Number: 5,566,490
[45] Date of Patent: Oct. 22, 1996

[54] SIGHT COVER

[76] Inventor: Dave Owen, P.O. Box 520407, Independence, Mo. 64052

[21] Appl. No.: 414,318

[22] Filed: Mar. 31, 1995

[51] Int. Cl.⁶ .............................. F41G 1/04; G02B 23/16
[52] U.S. Cl. .................................... 42/90; 33/244
[58] Field of Search ................... 33/244; 42/90, 42/96, 100; 359/511

[56] References Cited

U.S. PATENT DOCUMENTS

| | | | |
|---|---|---|---|
| 2,514,257 | 7/1950 | Reavis | 33/244 |
| 2,738,585 | 3/1956 | Vissing | 33/244 |
| 2,849,795 | 9/1958 | Vissing | 33/244 |
| 3,208,146 | 9/1965 | Nelson | 33/244 |
| 3,426,433 | 2/1969 | Anderson | 359/511 |
| 3,496,642 | 2/1970 | Pfahler | 33/244 |
| 3,642,345 | 2/1972 | Akin, Jr. et al. | 33/244 |
| 3,746,423 | 7/1973 | Mills | 33/244 |
| 3,831,285 | 8/1974 | Vissing | 33/244 |
| 4,280,644 | 7/1981 | Shindelka | 224/149 |
| 4,974,806 | 12/1990 | Matern | 248/499 |
| 5,003,697 | 4/1991 | Hampton | 33/244 |
| 5,031,910 | 7/1991 | Kopp | 273/55 R |
| 5,150,528 | 9/1992 | Shire | 33/244 |
| 5,183,953 | 2/1993 | Anderson et al. | 33/244 |
| 5,433,435 | 7/1995 | Bourie | 273/26 E |

*Primary Examiner*—Michael J. Carone
*Assistant Examiner*—Christopher K. Montgomery
*Attorney, Agent, or Firm*—Chase & Yakimo

[57] ABSTRACT

A sight cover for a sight, e.g. a gun sight, comprises first and second lens covers for the eyepiece and objective ends of the sight. The longitudinally displaced covers have three elastic cords extending in tension between the covers when the covers are in place. One elastic cord running adjacent the top of the sight is shorter than the other two cords causing a greater tension therein. On flipping the eyepiece end cover towards the top of the sight the top cord urges the eyepiece cover up and over the sight. The return of the three cords to their normal, untensioned positions springily displaces not only the cover from the objective end of the sight but also the entire sight cover away from the sight. The sight cover is tethered at one end to the rifle or the like.

19 Claims, 4 Drawing Sheets

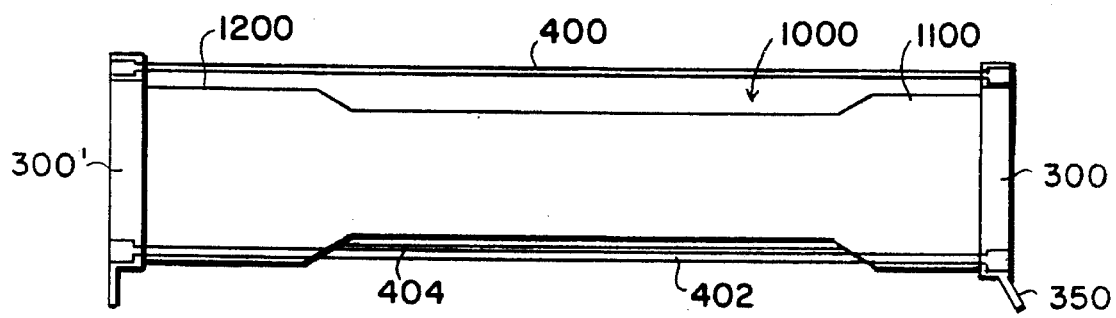
FIG. 2
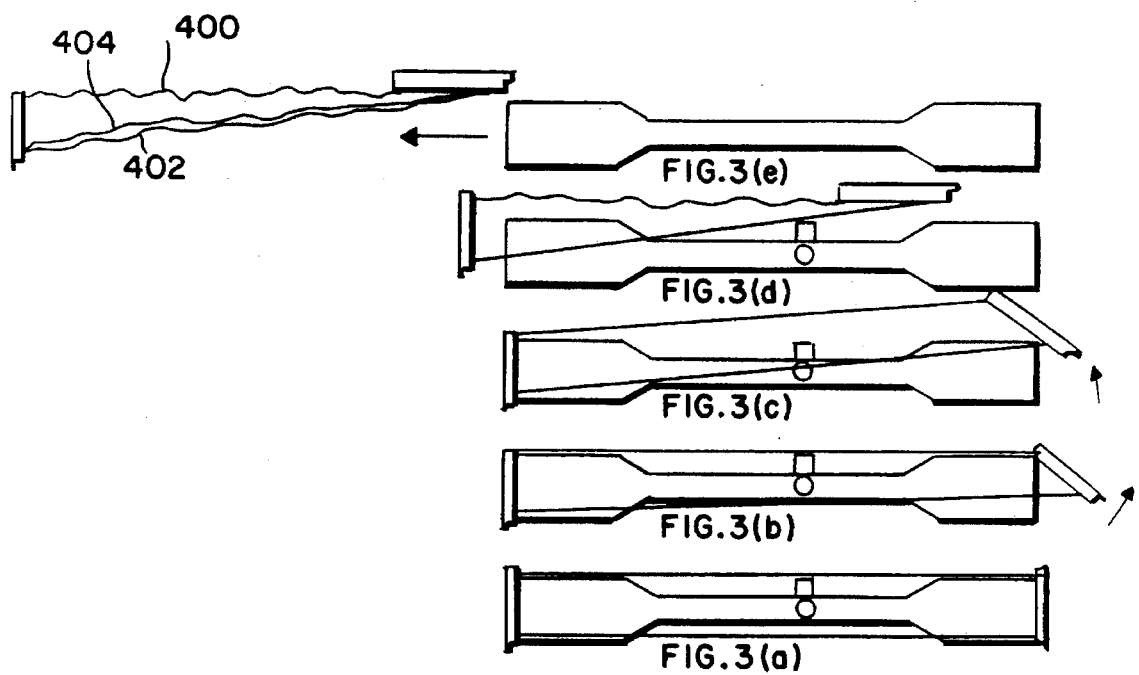

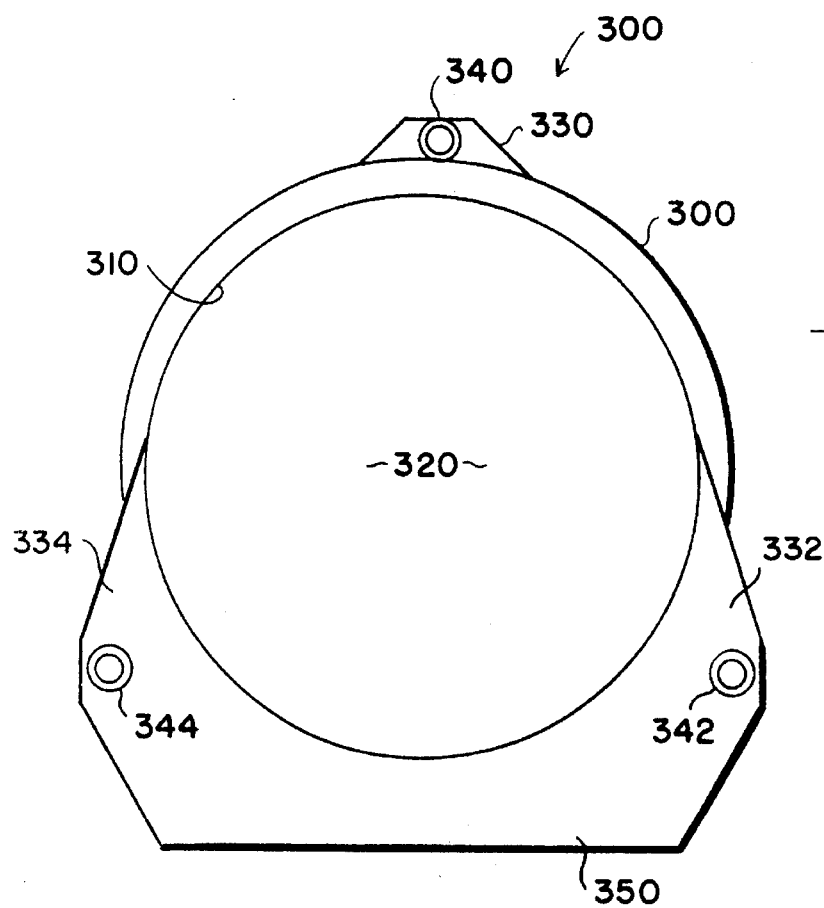
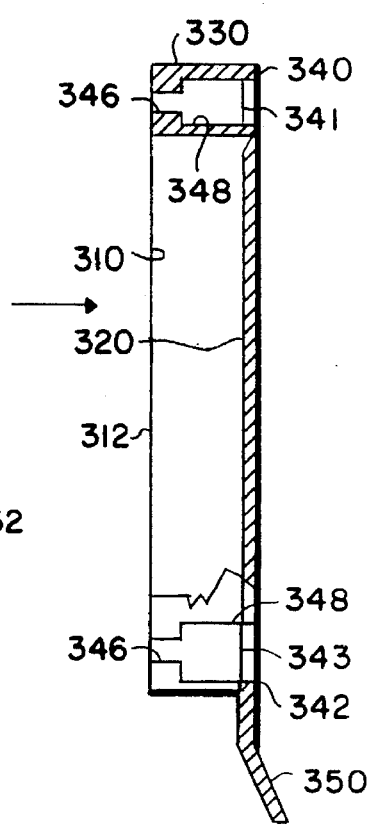
FIG. 4
FIG. 5

SIGHT COVER

BACKGROUND OF THE INVENTION

This invention relates to a cover for a sight and, more particularly, to a releasable lens protector for the eyepiece and objective ends of a sight.

During use of a gun or other type of sight it is desirable to releasably cover the eyepiece and objective ends of the sight so as to protect the sight lenses from the weather elements. It is also desirable to protect these sight lenses from other surrounding elements such as tree limbs, bushes, dust, dirt and other foreign matters. Upon mounting the sight to the gun it is necessary to be able to instantaneously remove the sight cover so as to enable use of the sight. Subsequently the cover should be easily reinstalled on the sight.

Various covers have been proposed to address these desires. However, such covers are generally attached to the sight or require modifications or addition of other elements to the sight for use. Also, in some cases the displaced sight cover may still interfere with sight use as the cover is not fully clear of the sight. Moreover, such cover devices are not readily adaptable for use among various types of sights.

In response thereto I have provided a sight cover which positions first and second lens covers about the sight ends. The lens covers are maintained in place by a pair of tensioned elastic cords extending between the covers and free of the sight. Another tensioned elastic cord of lesser length than the first and second cords extends between the covers and along the top of the sight. A tab extends from the sight cover at the eyepiece end. Upon the user flipping the tab of the eyepiece lens cover, the return of the tensioned elastic bands to their normal position springs the lens covers away from the gun sight so as to present the same to the shooter for quick and unobstructed use. A tether tied at one end of the objective lens cover keeps the disengaged cover close to the associated rifle.

Accordingly, it is a general object of this invention to provide a cover for a sight or the like to protect the sight from weather and/or other surrounding elements.

Another object of this invention is to provide a cover, as aforesaid, which is readily disengageable from the sight.

Still another object of this invention is to provide a cover, as aforesaid, which readily springs the cover from the sight so as to not interfere with the sight use.

A further object of this invention is to provide a sight cover, as aforesaid, which is readily adaptable for use with sights of various types.

A still further object of this invention is to provide a cover, as aforesaid, which utilizes tensioned elastics to hold the cover in place as well as to spring the cover from the sight.

A further object of this invention is to provide a cover, as aforesaid, which is simple to use and install on various types of sights including gun sights.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 1 is a perspective view, on an enlarged scale, showing the cover in place on a sight as displaced from a rifle or the like;

FIG. 2 is a side elevation view of the cover in place on the sight of FIG. 1 on a reduced scale;

FIGS. 3(a)–3(e) are a plurality of diagrammatic views of the cover and sight of FIG. 2 on a reduced scale, showing in progression from the lower figure thereof the springing of the cover from the sight;

FIG. 4 is a front view of one of the covers for the eyepiece portion of the sight on an enlarged scale;

FIG. 5 is a side view of the cover of FIG. 4;

DESCRIPTION OF THE PREFERRED EMBODIMENT

Figure 1:
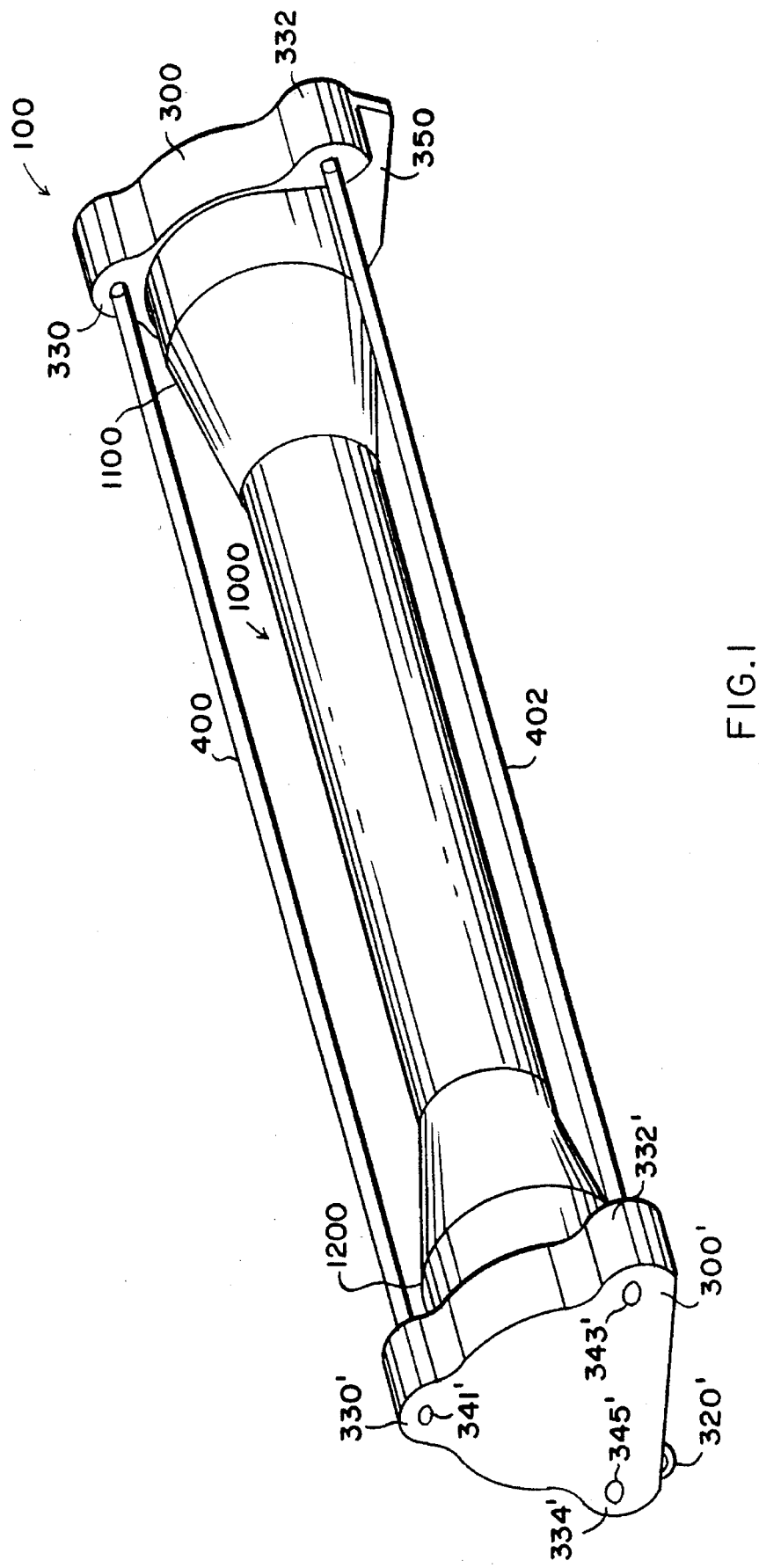
Figure 6:
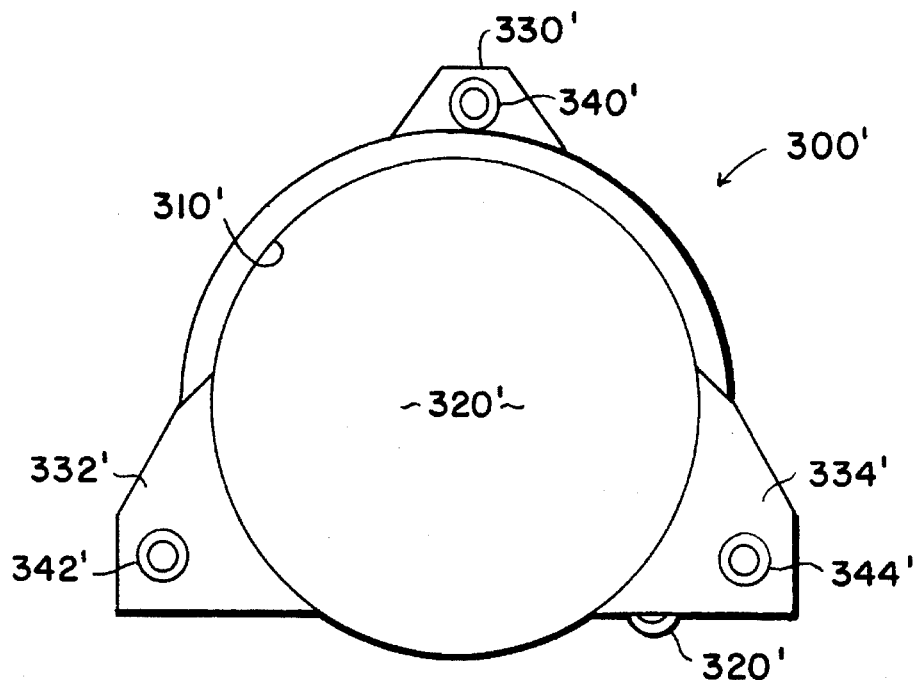
FIG. 6 is a front view of the cover for the objective end of the sight.
Figure 7:
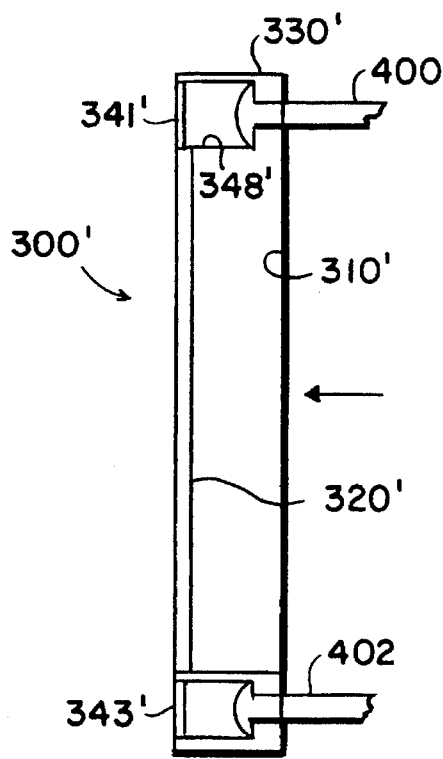
FIG. 7 is a side view of the cover of FIG. 6.

Turning more particularly to the drawings, FIG. 1 generally shows a gun sight 1000 as having an eyepiece end 1100 and an objective lens end 1200. It is understood that the sight 1000 is mounted atop a rifle or the like.

The cover 100 generally comprises first and second housings 300, 300' adapted for respectively protecting the objective 1200 and eyepiece 1100 ends.

The eyepiece housing 300 is as shown in FIG. 4. The housing 300 is generally triangular shaped in configuration and presents an open circular chamber 310 therein. The chamber 310 presents a rear wall atop which is placed a neoprene insert 320. The configuration of the chamber 310 allows for an insert of the eyepiece end 1100 of the sight 1000 therein.

Located about the housing 300 are lobes 330, 332, 334 which contain conduits 340, 342, 344 therein. Each conduit 340, 342, 344 extends throughout the respective lobe and presents a first bore 346 in communication with an enlarged second bore 348. Plugs 341, 343, 345 close the aperture presented on the exterior surface of the respective lobes by the terminus of the larger bore 348.

The respective conduits 340, 342, 344 are designed to receive the ends of elastic cords 400, 402, 404. As such each elastic cord 400, 402, 404 is knotted at one end and placed in the larger bore 348 with the adjacent elastic cord then extending through the smaller bore 346. Upon the knotted end being placed in the larger bore 348 the respective plugs 341, 343, 345 are then inserted into the larger bores 348 to cover the knots. A tab or lifter 350 extends from the underside of the eyepiece housing 300.

A similar lens piece cover 300' is shown at the opposed end of the cover 100 for receiving the objective end 1200 of the sight 1000 therein. The objective lens housing cover 300' is similar in configuration to the eyepiece lens housing cover 300. As such, like elements are provided with primed numbers identical to the numbers provided in eyepiece cover 300. The housing cover 300' does not have a lifter 350 depending therefrom.

Extending between these lens covers 300, 300' are the three elastics 400, 402, 404 in the form of cords with the opposed ends of the elastic cords being knotted and placed in the respective bores 348 of the orifices 340', 342', 344' as above described. The top cord 400 is shorter in length (about one inch) than the other cords 402, 404. The length of the cords 400, 402, 404 between the lens covers 300, 300' places all cords in tension when the covers 300, 300' are in their functional position, i.e. the respective ends 1100, 1200 of the gun sight 1000 are within the respective chambers 310, 310'. The bias of the cords 400, 402, 404 to their normal untensioned position firmly secures the covers 300, 300' onto the sight ends 1100, 1200.

The top cord 400, being shorter than the cords 402, 404, has a greater tension. Thus, the bias provided by this top cord 400 at the top lobes 330, 330' urges the top lobes 330, 330' of the lens covers 300, 300' one towards the other. However, this top cord 400 bias is not sufficient to displace the seated covers 300, 300' off the sight ends 1100, 1200.

To remove the cover 100 the user upwardly flips the lifter 350 from the normal depending FIG. 3(a) position towards the FIG. 3(b) position. The bias at the top lobe 330 of the cover 300 will urge the cover 300 towards the top of the sight as shown in FIG. 3(c). Once the cover 300 reaches this FIG. 3(c) position, i.e. above the sight 1000, all three tensioned cords 400, 402, 404 return toward their normal position. This cord action causes the cover 300' to be displaced from the objective end 1200 of the sight.

The cords 400, 402, 404 and tension therein are selected so that the entire cover 100 springs forwardly from the sight as shown in FIGS. 3(a)–3(e). Thus, the elastics combine to spring the cover 100 up and away from the sight 1000. A tether line (not shown) extends from a depending eye 320' on cover 300' with the other end of the tether line being attached to the rifle or the user. The tether line precludes the cover 100 from being entirely displaced from the rifle proper.

The use of the above structure 100 provides a scope/sight which is easily attached and springily removed from the sight 1000. The above elements allow the cover 100 to be attached to a wide range of sights. Also, the cover 100 need not be restricted to a gun sight 1000 but could also be used on other devices, e.g. telescopes, binoculars, etc.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A lens cover for a sight comprising:

a first housing presenting a cover adapted for a first end of a sight;

a second housing presenting a cover adapted for an opposed second end of the sight;

a first pair of elastics extending between said first and second housings, said first pair of elastics being in tension when said housings are positioned at the first and second ends of the sight;

a second elastic extending between a top portion of said first and second housings, said second elastic having a length less than said first pair of elastics and being in tension when said housings are positioned at the first and second ends of the sight for urging one of said housings over a top of the sight upon movement of said housing away from the adjacent sight end, said tensioned elastics returning to a normal untensioned position upon movement of a portion of one of said housings away from the adjacent sight end, said elastic movement springily displacing said housings away from the ends of the sight.

2. The apparatus as claimed in claim 1 further comprising a tab depending from one of said housings, said tab being lifted by a user to provide said movement of said one of said housings away from the adjacent sight end.

3. The apparatus as claimed in claim 1 further comprising means for releasably engaging first and second ends of each elastic to said housings.

4. The apparatus as claimed in claim 3 wherein said engaging means comprises conduits extending through each of said housings, each of said conduits having means thereon for engaging an end of each of said elastics extending between said housings.

5. The apparatus as claimed in claim 4 wherein each conduit comprises:

a first bore of a first cross section extending through each housing;

a second bore of a cross section greater than said first cross section, said second bore receiving a knotted end of said elastic therein with said remaining elastic extending through said first bore and towards said other housing.

6. The apparatus as claimed in claim 5 further comprising a plug for insertion into said second bore.

7. The apparatus as claimed in claim 1 further comprising means for tying one end of a line to one of said housings.

8. The apparatus as claimed in claim 1 wherein each housing presents an open chamber for receiving a sight end therein.

9. A lens cover for a sight comprising:

a first housing presenting a cover adapted for a first end of a sight;

a second housing presenting a cover adapted for an opposed second end of the sight;

a pair of parallel first elastics extending in tension between said housings for urging said first and second housings one towards the other when said housings are positioned at the first and second ends of the sight;

a second parallel elastic extending between said housings and of a shorter length than said parallel first elastics, said second elastic relatively shorter than said first elastics for extension in a relatively greater tension between said housings when said housings are positioned at the first and second ends of the sight whereupon portions of said housings associated with said second elastic are urged one towards the other;

means on one of said housings for displacing one of said housings away from the sight end, whereupon said tensioned second elastic urges said housing portions one towards the other and away from the sight ends upon return of said second elastic to a normal untensioned position with said first elastics further urging said cover away from the sight upon return to a normal untensioned position.

10. The apparatus as claimed in claim 9 wherein said displacing means comprises a tab depending from said one of said housings, said tab urged by a user to a position away from the sight end.

11. A lens cover for a sight comprising:

a first housing presenting a cover adapted for a first end of a sight, said housing having a configuration presenting a base and an apex;

a second housing presenting a cover adapted for an opposed second end of the sight, said second housing having a configuration presenting a base and an apex;

first and second elastics extending between said bases of said first and second housings, said first and second elastics being in tension when said housings are positioned at the first and second ends of the sight;

a third elastic extending between each apex of said first and second housings, said third elastic having a length less than said first and second elastics and extending in tension along a top of the sight when said housings are positioned at the first and second ends of the sight, said tensioned elastics returning to a normal untensioned position upon movement of a portion of one of said housings away from the adjacent sight end, said elastic return movement displacing said housings away from the ends of the sight in a manner to spring at least one of said housing covers upward and forward relative to the sight.

12. A lens cover for a sight comprising:

a first housing presenting a cover adapted for a first end of a sight;

a second housing presenting a cover adapted for an opposed second end of the sight;

at least one first elastic extending between said first and second housings;

a second elastic extending between said first and second housings;

a conduit extending through each of said housings for engaging an end of each of said elastics extending between said housings, said at least one first elastic and second elastic being in tension when said housings are positioned at the first and second ends of the sight, said second elastic having a length less than said first elastic and being in greater tension when said housings are positioned at the first and second ends of the sight, said tensioned elastics returning to a normal untensioned position upon movement of a portion of one of said housings away from the adjacent sight end, said elastic movement springily displacing said housings away from the ends of the sight.

13. The apparatus as claimed in claim 12 wherein each conduit comprises:

a first bore of a first cross section extending through each housing;

a second bore of a cross section greater than said first cross section, said second bore receiving a knotted end of each elastic therein with said remaining elastic extending through said first bore and towards said other housing.

14. The apparatus as claimed in claim 13 further comprising a plug for insertion into said second bore.

15. The apparatus as claimed in claim 12 wherein said at least one first elastic comprises a pair of elastics extending between said first and second housings.

16. The apparatus as claimed in claim 15 wherein said second elastic extends between a top portion of each housing, said second elastic urging one of said housings over a top of the sight upon said movement of said housing away from the adjacent sight end.

17. The apparatus as claimed in claim 12 further comprising a tab depending from one of said housings, said tab being lifted by a user to provide said movement of said one of said housings away from the adjacent sight end.

18. The apparatus as claimed in claim 12 further comprising means for tieing one end of a line to one of said housings.

19. The apparatus as claimed in claim 12 wherein each housing presents an open chamber for receiving a sight end therein.

* * * * *